United States Patent
Wang

(10) Patent No.: US 7,151,868 B1
(45) Date of Patent: Dec. 19, 2006

(54) OPTICAL SWITCH HAVING A REFLECTIVE COMPONENT

(75) Inventor: Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 251 days.

(21) Appl. No.: 10/673,623

(22) Filed: Sep. 29, 2003

Related U.S. Application Data

(60) Provisional application No. 60/418,445, filed on Oct. 15, 2002.

(51) Int. Cl.
    G02B 6/42    (2006.01)
    G02B 6/26    (2006.01)
(52) U.S. Cl. .............................. 385/16; 385/18; 385/40
(58) Field of Classification Search ..................... None
    See application file for complete search history.

(56) References Cited

U.S. PATENT DOCUMENTS

| | | | |
|---|---|---|---|
| 5,173,956 A | 12/1992 | Hayes | |
| 5,653,008 A | 8/1997 | Sim et al. | |
| 5,917,596 A * | 6/1999 | Jenkins et al. | ............... 356/491 |
| 6,198,856 B1 * | 3/2001 | Schroeder et al. | ............. 385/17 |
| 6,356,679 B1 * | 3/2002 | Kapany | ....................... 385/18 |
| 6,654,188 B1 | 11/2003 | Stone | |
| 6,657,771 B1 | 12/2003 | Okayama | |
| 6,674,164 B1 | 1/2004 | Rippel et al. | |

* cited by examiner

*Primary Examiner*—Sung Pak
(74) *Attorney, Agent, or Firm*—Workman Nydegger

(57) ABSTRACT

A reflective optical switch for use in optical systems, such as fiber optic communications networks, is disclosed. The optical switch includes not only signal transmission characteristics, but also signal reflection capability. The optical switch includes a semiconductor substrate having first and second optical signal waveguides disposed thereon. The two waveguides intersect one another at a selected angle to form an intersection region. A thermal element is disposed atop the intersection region and can be activated to alter the index of refraction of a portion of the intersection region. An optical signal passing through the intersection region is diverted from one waveguide to another according to the heating of the intersection region by the thermal element. A reflective component disposed in a terminal end of one of the waveguides reflects selected optical signals back to the source from which they came.

23 Claims, 6 Drawing Sheets

OPTICAL SWITCH HAVING A REFLECTIVE COMPONENT

CROSS REFERENCE TO RELATED APPLICATIONS

This application claims the benefit of U.S. Provisional Application No. 60/418,445, filed Oct. 15, 2002, which is incorporated herein by reference in its entirety.

BACKGROUND OF THE INVENTION

1. The Field of the Invention

The present invention generally relates to optical signal switching devices. More particularly, the present invention relates to an optical switch that enables both signal transmission switching and reflection in a single device.

2. The Related Technology

The increased demand for data communication and the remarkable growth of the internet have resulted in increased demand for communication capability within metropolitan areas. There has also been an equally large increase in demand for communication capability between large metropolitan areas. Optical communication systems using a network of fiber optic cables are being developed and installed to meet this increased demand.

Various types of optical switches for switching and routing optical signals are currently used in communication systems and computer systems. For example, one type of presently available optical switch includes a matrix of thermooptic switching elements interconnected by waveguides formed on a silica substrate. Switching of light signals is accomplished by the use of thin film heaters to vary the temperature of the switching elements. Electrical circuits are also provided to supply switching current to the heaters. A heat sink may be provided to dissipate heat caused by the switching operations. One example of such a switch is shown in U.S. Pat. No. 5,653,008.

Other types of switches, known as planar optical switches, are currently available for some applications. Planar switches are often fabricated by Ti-diffusion in $LiNbO_3$. Switched directional couplers represent one example of $LiNbO_3$-based switches that are commercially available. $LiNbO_3$ planar switches are characterized by high switching speeds, often in the sub-nanosecond range. However, such switches are generally sensitive to the polarization of the light forming the optical signal, which can limit their utility. Furthermore, $LiNbO_3$ switches are relatively expensive to manufacture.

Still other optical switches use a semiconductor substrate with vertical current flow to heat active regions of the switch and enable routing of the optical signal to occur. One example of such a switch is shown in U.S. Pat. No. 5,173,956. However, such optical switch designs often have poor scalability, relatively high manufacturing costs and low optical signal bandwidth.

In addition to the above, some optical switching applications require selective reflection of the optical signal, in addition to traditional signal switching and routing. One such application where this is desired involves the reflection of optical signals between primary and secondary optical transmitters in a redundant optical signal communications system. Though devices to reflect an optical signal are present in the art, optical switches that provide both switchable signal transmission and signal reflection are not.

In light of the above, a need exists for an optical switching device that overcomes the problems present in the art. Specifically, a need exists for a unitary, low-cost optical switch capable of both wide band optical signal transmission and reflection. Moreover, such an optical switch should be readily integrated into a variety of optical systems, such as fiber optic communications systems.

BRIEF SUMMARY OF THE INVENTION

Briefly summarized, embodiments of the present invention are directed to a reflective optical switch that substantially reduces or eliminates disadvantages and problems associated with presently available optical switches. The present invention provides an optical switch that uses internal reflection principles to provide switching of optical signals between a plurality of optical signal waveguides in response to heating from a thermal element. The present switch is operable over a wide range of optical signals, thus providing a low-cost, wide band optical switch that is not wavelength dependent.

In addition to the above switching capabilities, the present optical switch further includes the capacity to selectively reflect incoming optical signals. This enables configuration of optical switches having both signal transmission and signal reflection capabilities, making the switch useful in a variety of applications.

In one embodiment, the present invention comprises an optical switch having a waveguide array comprising first and second waveguides that are well matched for use with single mode fibers. The first waveguide includes an inlet/outlet end through which optical signals are introduced into the optical switch, and a terminal end. A reflective component, comprising a highly reflective coating of sodium or other appropriate material, is disposed at the terminal end of the first waveguide. The second waveguide includes an outlet port through which optical signals can exit the switch. The first and second waveguides intersect with one another to define a relatively small angle between them. The area where the waveguides cross is known as the intersection region.

A diverting element for diverting optical signals between the waveguides is located at the intersection region. In one embodiment, the diverting element is an electrode heater located atop the intersection region. In other embodiments, the diverting element is a liquid crystal or superlattice structure positioned in the intersection region. Electrical leads supply a voltage to the diverting element to enable its operation. In the case of the electrode heater, a voltage applied to the electrode heater creates heating of a specified portion of the intersection region. This heating is sufficient to modulate the index of refraction of the specified portion of the intersection region, which enables the switching of optical signals between the first and second waveguides. The location of the electrode may be selected in accordance with teachings of the present invention to maximize switching efficiency through temperature-induced perturbation. Similar processes are followed for the liquid crystal or superlattice structure.

The above-described optical switch operates to provide either pass-through or reflection of an incoming optical signal in a 1×1 configuration. In an electrode heater-equipped optical switch, an optical signal is received by the inlet/outlet end of the first waveguide then transmitted via the first waveguide to the intersection region defined by both the first and second waveguides. Depending on whether the intersection region is being heated by the electrode, the signal either continues through the intersection region via the first waveguide, or is deflected into the second waveguide. If deflected to the second waveguide, the signal proceeds to the outlet thereof and exits the switch. If allowed to stay in the first waveguide, however, the signal proceeds to the terminal end thereof, where it is reflected by the reflective component disposed at the terminal end. Reflection of the signal causes it to reverse direction and proceed back toward the intersection region in the opposite direction. It passes once again through the intersection region and exits the switch via the inlet/outlet port of the first waveguide for use by other components. The optical signal transmission/reflection capability of the present optical switch enables it to be used in a variety of optical applications, including certain redundant optical communications systems, where selective reflection or transmission of an optical signal is necessary.

In another embodiment, a 1×N reflecting optical switch is disclosed having a single optical signal input and a plurality of signal outputs, enabling selective transmission or reflection of optical signals. In yet another embodiment, an N×N switch is formed having multiple inputs and outputs. This switch also includes a reflective component to enable reflection of an incident optical signal via the first waveguide.

An optical switch formed in accordance with the teachings of the present invention provides high speed switching and/or reflection of optical signals in a communications network. Technical advantages of the present invention include a low cost, reliable optical switching device that can be integrated into small-sized optical networking systems. The present optical switch is intrinsically a wide band device, covering all S-band, C-band, and L-band optical signals. The optical switch may be fabricated on a wide variety of materials such as polymer/$SiO_2$, polymer/polymer, polymer/polymer/polymer and semi-insulating/semiconductor substrates. The optical switch may be used in general purpose optical communication systems including fiber optic networks associated with modern metropolitan communication systems. Typical specifications for an optical switching device formed in accordance with teachings of the present invention include cross talk between adjacent waveguides of less than thirty (30) dB, low insertion loss, and polarization-independent fast switching time for a thermal optic device. For various applications, the switching time may range from less than twenty milliseconds to much less than a millisecond. Technical benefits of the present invention include providing an optical switch that does not require conversion between optical signals and electrical signals.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–6 depict various features of embodiments of the present invention, which is generally directed to a reflective optical switch having the ability to not only redirect signals via a plurality of waveguides, but also to reflect an optical signal back to its source. This provides enhanced functionality not possible in known optical switches, and has particular applicability to fiber optic communications networks.

The terms "optical signal(s)" and "lightwave signal(s)" are used in this application to include the full range of all electromagnetic radiation that can be satisfactorily used to communicate information through a waveguide and/or fiber optic cable. An optical switching device incorporating teachings of the present invention can be satisfactorily used to switch or direct signals in the infrared, visible and ultraviolet spectrum. The optical switching device can be used to communicate not only digital information, but analog information as well.

The terms "polymer" and "polymers" are used in this application to include any macromolecule combinations formed by the chemical union of multiple, substantially identical combining units or monomers and have satisfactory characteristics for use as a waveguide for optical signals. Combinations of two, three or four monomers are often referred to respectively as dimmers, trimers, and tetromers. These combinations may be further classified as inorganic, organic, natural, synthetic or semisynthetic. For purposes of this application, the terms "polymers and other combinations of monomers" and "polymers or other combinations of monomers" are understood to mean any combination of two or more monomers which can be satisfactorily used to form a waveguide in accordance with teachings of the present invention including, but not limited to, inorganic, organic, natural, synthetic and semisynthetic combinations.

Figure 1:
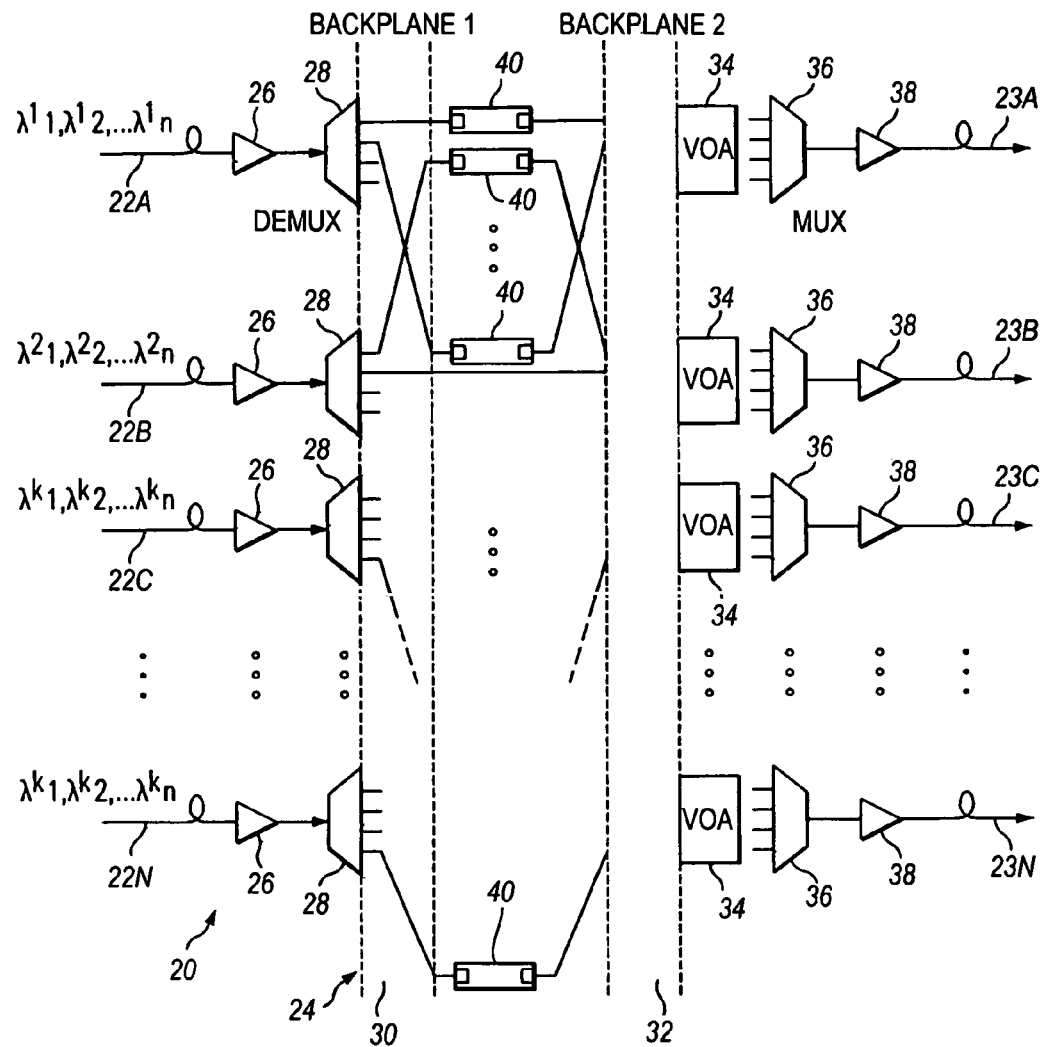
FIG. 1 is a schematic drawing showing various components associated with an optical communications system.

Reference is first made to FIG. 1, wherein a general environment in which the optical switch of the present invention can be implemented. A portion of a communication system is generally depicted in FIG. 1 at 20. The communications system 20 includes a plurality of fiber optic cables 22 and 23. Wavelength division multiplexing (WDM) techniques are used in the present system 20 to allow each fiber optic cable 22 and 23 to carry multiple optical signals at various wavelengths, which substantially increases the efficiency of each fiber optic cable 22 and 23. Recently, dense wavelength division multiplexing (WDM) techniques have been developed to allow existing fiber optic networks to better satisfy the increased demand for communication capabilities.

Communication system 20 as shown in FIG. 1 preferably includes at least one switching center 24 having multiple optical switches 40 formed in accordance with teachings of the present invention. Optical switches 40 cooperate with each other to allow switching of a selected optical signal from one fiber optic cable 22 to a selected fiber optic cable 23. For purposes of describing various features of the present invention, switching center 24 will be described as having a plurality of input fiber optic cables 22 designated as 22A, 22B, 22C through 22N and a plurality of output fiber optic cables 23A designated as 23A, 23B, 23C through 23N. A large number of fiber optic cables can be satisfactorily coupled with optical switching center 24.

Various features of the present invention will be described with respect to switching an optical signal as it travels from an input fiber optic cable 22 to an output fiber optic cable 23 and from the input end of a waveguide to the output end of a waveguide. However, an optical switch formed in accordance with teachings of the present invention can be satisfactorily used to switch optical signals traveling in either direction through a fiber optic cable network or through associated waveguides. The optical signals can carry either digital information or analog information.

Each fiber optic cable 22 can be coupled with switching center 24 through a respective amplifier 26 and dense wavelength division (WD) demultiplexer 28. Backplane 30 is preferably provided for use in optically coupling each DWD demultiplexer 28 with optical switches 40. A second backplane 32 is preferably provided to couple the output from optical switches 40 with variable optical attenuators 34.

In a typical wavelength division multiplexing system, the power level of each signal transmitted from a respective input fiber optic cable 22 to a respective output fiber optic cable 23 can vary significantly. The power level for each signal communicated through second backplane 32 is preferably adjusted to avoid communication problems associated with multiple signals at different power levels. Thus, variable optical attenuators 34 are provided to adjust the power level of all signals exiting from backplane 32 to within a desired range. A plurality of DWD multiplexers 36 are respectively coupled with variable optical attenuators 34. The signals communicated from each DWD multiplexer 36 are preferably directed through a respective amplifier 38 and then to the associated fiber optic cable 23A through 23N.

Figure 2A:
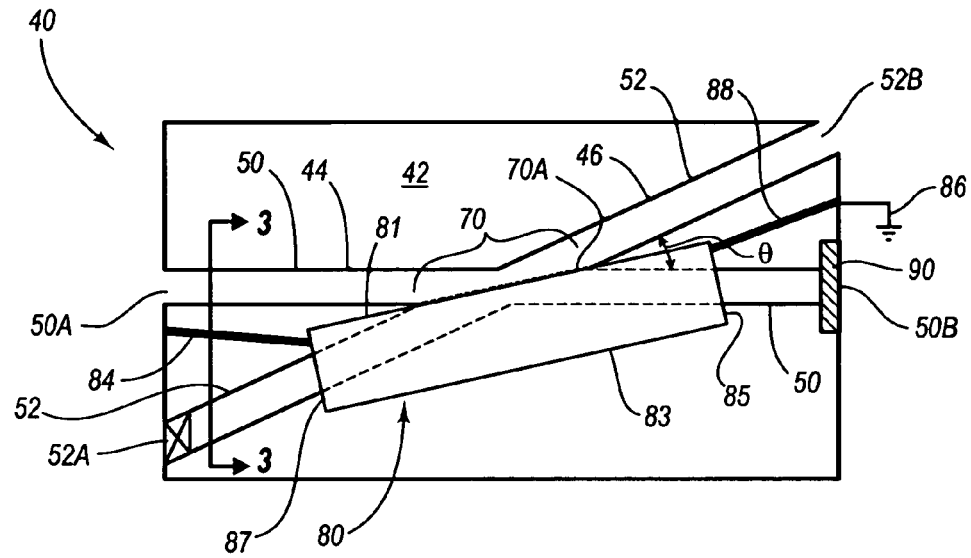
FIG. 2A is a schematic drawing showing various features of the present optical switch according to one embodiment.

Reference is now made to FIG. 2A, showing a schematic top view of various features of one embodiment of the present optical switch, generally designated at 40. The optical switch 40 includes a substrate 42 in which is disposed a first channel 44 and a second channel 46. Defined within the first and second channels 44 and 46 are first and second waveguides 50 and 52, respectively. The first and second channels 44 and 46, and the first and second waveguides 50 and 52 can be formed on the substrate 42 using known semiconductor fabrication techniques. The first waveguide 50 includes a first end 50A and a second terminal end 50B. Similarly, the second waveguide 52 includes a first terminal end 52A and a second end 52B. As will be explained in greater detail below, in the present embodiment the first end 50A of first waveguide 50, and the second end 52B of second waveguide 52 are configured to receive and transmit optical signals, while the second terminal end 50B and first terminal end 52A are not configured for such transmission. However, it is appreciated that in other embodiments, the first end 52A can be optically transmissive. Also, both the first and the second waveguides 50 and 52 are configured to accept and carry optical signals traveling in either direction through the waveguides. Note here that the near field of the first and second waveguides in one embodiment is identical or similar to that of single mode optical fibers (not shown) that interface with the waveguides.

The first and second waveguides 50 and 52 intersect one another on the substrate 42. This area of junction between the two waveguides 50 and 52 is known as an intersection region 70. The first and second waveguides 50 and 52 intersect each other at a specified angle θ. The angle θ is selected to have a magnitude of between approximately two degrees (2°) and six degrees (6°) depending upon the microstructure of the material used to form the waveguides and the associated index of refraction. For one application, the angle θ is preferably approximately three degrees (3°). By forming the optical switch 40 with an angle θ having a value between approximately two and six degrees, an optical signal may travel through respective waveguides 50 and 52 without any destructive perturbation at the intersection region 70.

The present optical switch 40 further includes a diverting element that serves as a means for diverting an optical signal from one of the waveguides 50 or 52 to the other waveguide during switch operation. In the present embodiment, the function of the diverting element is provided by a thermal element, such as an electrode heater 80. As discussed later in more detail, the electrode heater 80 is employed to apply heat to a portion of the intersection region 70 to enable the selective switching of optical signals between the first and second waveguides 50 and 52. As such, in the present embodiment, electrode heater 80, serving as the diverting element, is disposed proximate the intersection region 70. The electrode heater 80 can be formed from a variety of materials including nickel chrome alloys (NiCr) and chromium gold (Cr/Au). Electrical current for the electrode heater 80 is provided by an appropriate current source (not shown) formed on the substrate 42. The current flows from the current source through a lead 84, through the electrode heater 80, and returns to a ground plane 86 through a lead 88. In addition to the current source, the leads 84 and 88, and ground plane 86 can be formed on the substrate 42 using conventional semiconductor fabrication techniques. It is noted the electrode heater shown and described herein as the diverting element is but one example of an appropriate thermal element that can be employed with the present invention; other types of heaters and electrical connection schemes for the heater are also contemplated for use with the present invention.

In greater detail, the electrode heater 80, serving as the diverting element of the optical switch 40, has a generally rectangular configuration defined in part by a pair of longitudinal edges 81 and 83, and lateral edges 85 and 87. For the embodiment shown in FIG. 2A, longitudinal edges 81 and 83 have a length of approximately two hundred fifty micrometers (250 µm) and lateral edges 85 and 87 preferably have a length of approximately ten micrometers (10 μm). The vertical thickness of the electrode heater 80 is preferably very small as compared with the depth of the associated waveguides 50 and 52 as defined in the substrate 42. A layer of cladding (see FIG. 3) is preferably interposed between the intersection region 70 and the electrode heater 80.

As illustrated in FIG. 2A, the electrode heater 80 is preferably disposed atop one-half of the intersection region 70 that is defined between the first waveguide 50 and the second waveguide 52. In particular, the longitudinal edge 81 of the electrode heater 80 is disposed on an imaginary line generally corresponding with a longitudinal centerline 70A of the intersection region 70, shown in FIG. 2A. In this configuration, the electrode heater 80 is considered as being located at the intersection region 70. However, other positional and design variations on the present embodiment are possible, as will be seen further below. Further details concerning the electrode heater 80, as well as details concerning other aspects of the present invention, can be found in U.S. patent application Ser. No. 09/999,054, entitled "N×N Optical Switching Device Based on Thermal Optic Induced Internal Reflection Effect," filed Nov. 1, 2001, which is incorporated herein by reference in its entirety.

For some applications, the vertical spacing or distance between electrode heater 80 and the corresponding junction 70, as shown in FIG. 2A, is approximately five micrometers (5 μm) within a range of plus or minus 0.5 μm. Among other things, this facilitates adequate heating of a portion of the intersection region to occur as explained below. In addition, any lateral offset between the longitudinal edge 81 of the electrode heater 80 and the longitudinal center line 70A of the intersection region 70 does not exceed 9.5 μm. Should the lateral offset between longitudinal edge 81 of each electrode heater 80 and the longitudinal centerline 70A exceed this limit, the desired heating of the intersection region 70 and resulting internal reflection of an optical signal traveling therethrough may not occur.

The first waveguide 50 of the optical switch 40 of FIG. 2A further includes means for reflecting an optical signal traveling in the first waveguide. In presently preferred embodiments this function is provided by structure comprising a reflective component 90 disposed at the terminal second end SOB of the first waveguide 50. In particular, the reflective component 90 comprises a high reflective coating disposed at the terminal end SOB so as to reflect any optical signal incident upon it within the first waveguide 50. The high reflective coating can be comprised of a variety of reflective materials, but in one embodiment it is composed of sodium. The reflective sodium coating can be applied using known coating application techniques. The reflective component 90 prevents transmission of optical signals through the terminal end SOB of the first waveguide 50, and instead directly reflects any optical signal incident upon it back in the opposite direction along the first waveguide, as explained below in further detail.

Figure 2B:
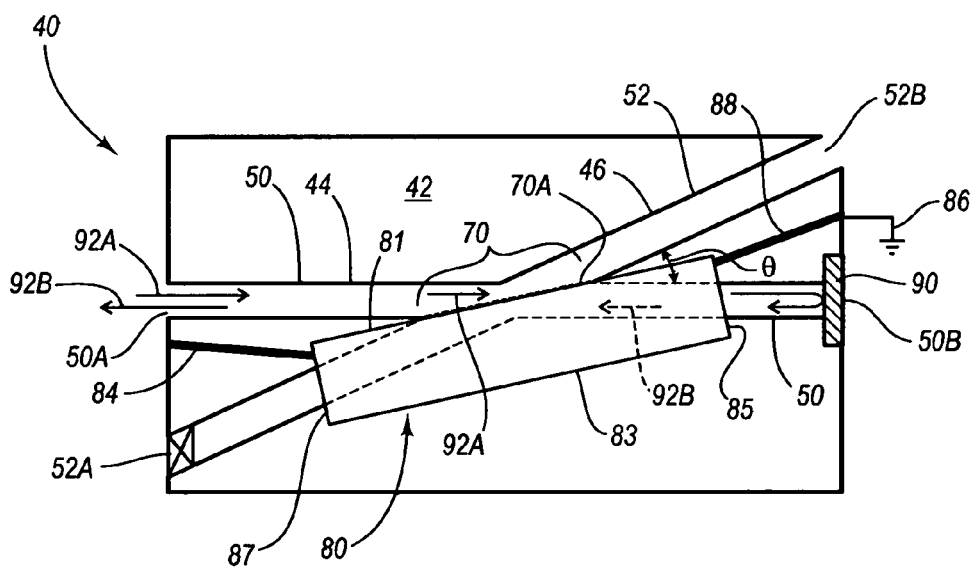
FIG. 2B is a schematic drawing of the optical switch of FIG. 2A, showing operation of the switch in one state.
Figure 2C:
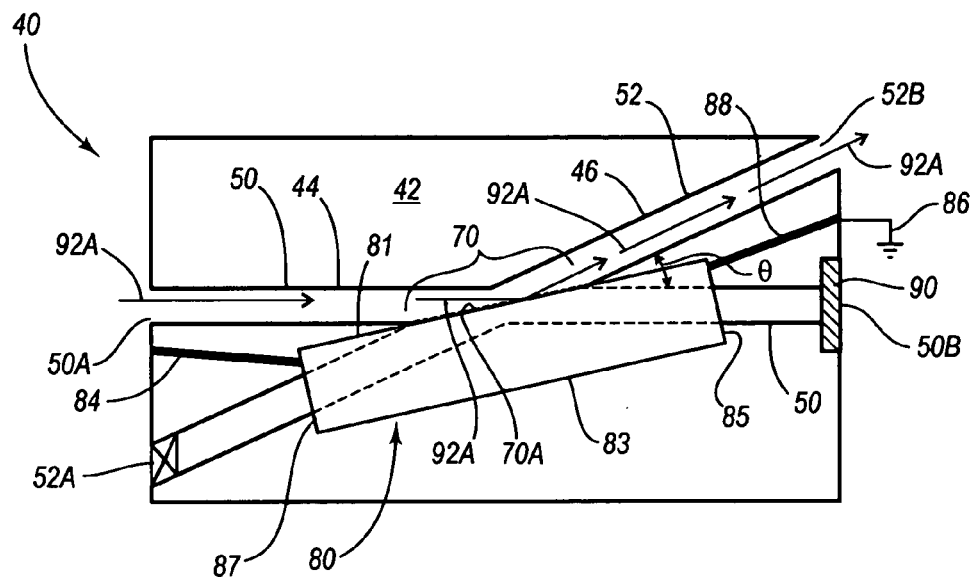
FIG. 2C is a schematic drawing of the optical switch of FIG. 2A, showing operation of the switch in another state.

Reference is now made to FIGS. 2B and 2C, which together illustrate various configurations of the optical switch 40 of FIG. 2A during operation thereof. In a first configuration illustrated in FIG. 2B, an optical signal is introduced at the first end 50A of the first waveguide 50, traveling in a first direction indicated by the arrows 92A. The optical signal can comprise a single wavelength produced by a device such as an optical transceiver module, or a plurality of wavelengths, such as a multiplexed optical signal produced by multiple transceiver modules. When the electrode heater 80 is inactive, the optical signal proceeds along the first waveguide 50 and through the intersection region 70 without diversion or deflection. The optical signal then continues its course along the first waveguide 50 until it is incident on the reflective component 90 disposed at the terminal second end 50B. At this point the reflective component 90, given its reflective surface, reflects the optical signal, causing it to reverse direction and proceed down the first waveguide 50 in a second direction, which is opposite the first direction, as indicated by arrows 92B. The reflected optical signal then proceeds back through the intersection region 70 and exits the first waveguide 50 via the first end 50A. The reflected optical signal can then return to its source of production, such as an optical transceiver, or to another apparatus for further processing.

FIG. 2C illustrates a second configuration for the optical switch 40 shown in FIG. 2A. As before, an optical signal is introduced at the first end 50A of the first waveguide 50, traveling in a first direction indicated by the arrows 92A. In contrast to the previous configuration illustrated in FIG. 2B, however, the electrode heater 80 in the present configuration is active, receiving an electrical current from the lead 84. When the electrical current is provided to the electrode heater 80, heating will occur both in the cladding material (see FIG. 3) and in the corresponding portions of waveguides 50 and 52 that define the intersection region 70 that is located beneath the electrode heater 80. The heating of the corresponding portion of the intersection region 70 beneath the electrode heater 80 operates to reduce the refractive index of the corresponding portion, which forms what can be considered as an imaginary mirror at the longitudinal centerline 70A of the intersection region 70. In contrast, the refractive index remains substantially unchanged in the portions of the intersection region 70 that are not disposed under the electrode heater 80.

The reduction of the index of refraction in the corresponding heated portion of the intersection region 70 enables deflection of the optical signal to occur via the process of total internal reflection. In effect, the heating caused by the electrode heater 80 produces an imagery mirror at the frontier between the heated and unheated portions of the intersection region 70, or centerline 70A, which deflects the optical signal via total internal reflection from the first waveguide 50 to the second waveguide 52. After deflection, the optical signal travels along the second waveguide 52 until exiting the optical switch 40 at the second end 52B. From here, the optical signal can proceed for further processing or travel via a communications network, such as that shown in FIG. 1. It is thus seen that the present optical switch 40 operates as a 1×1 reflective switch, enabling an optical signal to be either transmitted via the second waveguide 52 or reflected via the first waveguide 50, according to the state (i.e., heated or unheated) of the electrode heater 80.

As already mentioned, the optical switch described can be desirably utilized in a variety of applications, such as redundant optical signal communications systems. Two examples of such systems that can benefit from the present optical switch are disclosed in U.S. Provisional Patent Application No. 60/400,307, filed Aug. 1, 2002, and entitled "System and Method for Preventing Signal Loss in an Optical Communications Network," and Ser. No. 60/400,303, filed Aug. 1, 2002, and entitled "Preventing Signal Loss in an Optical Communications Network."

Note that the present invention has been described above in connection with optical signal deflection and reflection via the modification of the refractive index of waveguides defining the intersection region. It is appreciated, however, that in the case of signal deflection, the same effect can be achieved via other methods, including electrooptic, magnetooptic or acoustooptic methods. These and other modifications are therefore contemplated in connection with the present invention.

Figure 2D:
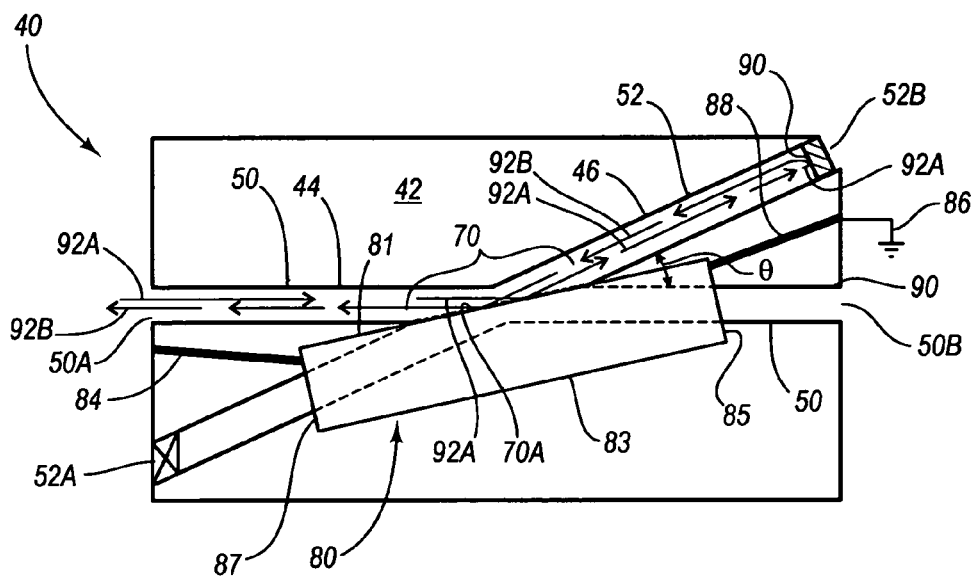
FIG. 2D is a schematic drawing of an optical switch made according to an alternative embodiment of the present invention.

Reference is now made to FIG. 2D, which depicts features of an alternative embodiment of the present optical switch. It is appreciated that the various features of the present switch 40 can be altered to suit a particular application. For instance, in some applications it may be desirable to alter the configuration of the waveguides 50 and 52 so that an optical signal, when the electrode heater 80 is in an un-activated state, can be transmitted through the optical switch 40 in an undeflected path via the first waveguide to exit through the second end 50B without being reflected back toward the first end 50A. This is achieved in FIG. 2D by removing the reflective component formerly located at the second end 50B of the first waveguide 50. In this way, optical signals that are introduced at the first end 50A, and are then transmitted via the first waveguide 50 such that they pass undeflected by heating of the electrode heater 80, can exit at the second end 50B and proceed through the optical communications network. As shown, the reflective component 90, formerly situated at the second end 50B, is instead located at the second end 52B of the second waveguide 52. This enables optical signals that are deflected from the first waveguide 50 to the second waveguide 52 at the intersection region 70 by the electrode heater 80 to be reflected at the second end 52B. This in turn causes the reflected optical signal to return to the intersection region 70, be re-deflected to the first waveguide 50 by the heating of the electrode heater 80, and exit the optical switch at the first waveguide end 50A.

Figure 3:
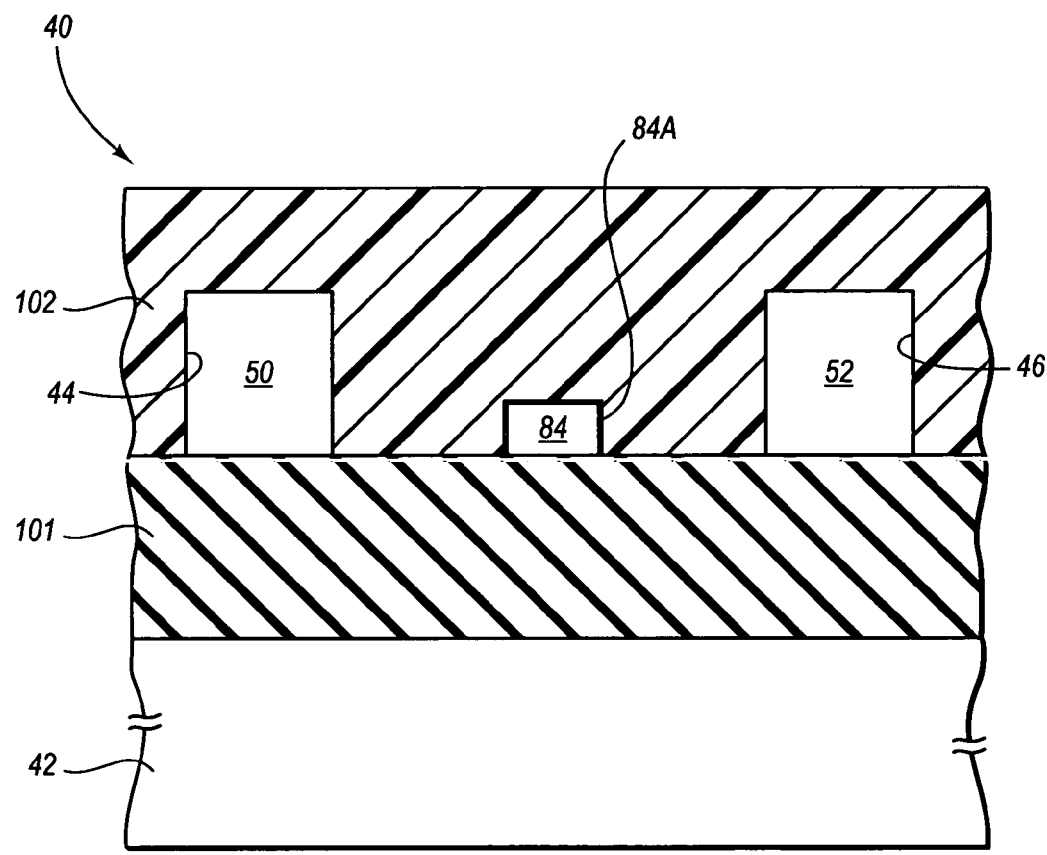
FIG. 3 is a cross sectional view of a portion of the optical switch of FIG. 2A, showing various features thereof.

Reference is now made to FIG. 3, which depicts portions of the optical switch 40 of FIG. 2A in cross section. FIG. 3 depicts further details of the waveguides 50 and 52 formed on the substrate 42 using semiconductor fabrication techniques to produce an optical switching device incorporating teachings of the present invention. The substrate 42 can be part of a typical silicon wafer used in semiconductor fabrication. However, an optical switching device can be formed in accordance with teachings of the present invention on a wide variety of substrates and is not limited to use with only conventional silicon substrates.

As suggested, first and second waveguides 50 and 52 of the optical switch 40 are preferably disposed in respective channels 44 and 46 formed in a layer of top cladding. The electrical lead 84 is also shown disposed in a respective channel 84A. The first and second waveguides 50 and 52 can be formed from a wide variety of materials including, but not limited to, polymers, polyimide, amorphous fluoropolymers such as those sold under the trademark Teflon® AF, a mixture of silicon dioxide and polymeric materials, ion exchange and polymer and fluorinated polyimide, perfluorocyclobutane (PFCB), bisbenzocylobutene (CBC), and fluorinated cyclobutane compounds. Many of these materials are available from Dow Chemical Company. For some applications a benzocyclobutene based polymer dielectric such as CYCLOTENE™ Resins from The Dow Chemical Company can be used. CYCLOTENE™ Resins are high-purity polymer solutions that have been developed for microelectronics applications. The resins are derived from B-staged bisbenzocyclobutene (BCB) monomers and are formulated as high-solids, low-viscosity solutions. Note that Teflon is a registered trademark of E.I. duPont de Nemours and Company. Teflon AF, Teflon AF 1600, Teflon AF 2200 and Teflon AF 2400 are available from duPont and other companies.

In one embodiment, an outer layer of the first and second waveguides 50 and 52 can be formed from Ultradel U 9120 polyimide having a refraction index of 1.5397 while the waveguide cores are comprised of Ultradel U 9020 polyimide having a refraction index of 1.526. Ultradel is a trade name associated with polyimide materials available from BP Amoco. Of course, other materials can also be used.

For some applications, the spacing between the channels 44 and 46 can be approximately eighty micrometers (80 µm), though other spacing arrangements are also contemplated. Each channel 44 and 46 preferably has a generally rectangular cross section with dimensions in the range of approximately six or seven micrometers (6 or 7 µm). Various features of the present invention will be described with respect to optical switch 40 as shown in FIG. 3.

Switch 40 as shown in FIG. 3 preferably includes a layer 101 of silicon dioxide ($SiO_2$) disposed immediately adjacent the substrate 42. For some applications, layer 101 may have a thickness of approximately fifteen micrometers (15 µm) with an index of refraction of approximately 1.445. Waveguides 50 and 52 can be formed on layer 101 from a combination of silicon dioxide and gallium oxide ($SiO_2$:$GaO_2$) with an index of refraction of approximately 1.4538. A second layer 102 is preferably formed on the first layer 101 and the waveguides 50 and 52 to provide the channels 44 and 46. Layer 102 can also be referred to as "top cladding." The respective waveguides 50 and 52 are thus disposed in respective channels 44 and 46. For the embodiment of the present invention as shown in FIG. 3, layer 102 can be formed from Teflon AF 1600 having an index of refraction of approximately 1.31. The thermal optic coefficient of many polymers is generally less than zero. As a result, when the temperature of such polymers is increased, the corresponding index of refraction is reduced. Teflon AF 1600 represents one example of a polymer having the desired thermal optic coefficient.

In another embodiment, the first layer 101 of the optical switch 40 can comprise silicon dioxide having a thickness of approximately 2.4 micrometers (2.4 µm). The second layer or top cladding 102 can be formed from polymeric material such a Ultradel 9021 having an index of refraction of approximately 1.526. Also, the waveguides 50 and 52 can be formed from Ultradel 9120 having an index of refraction of approximately 1.5397.

In yet another embodiment, the first layer 101 can be formed from Teflon AF 240 having an index of refraction of approximately 1.29. The second layer or top cladding 102 can be formed from Teflon AF 240 having an index or refraction of 1.29. The thickness of the first layer 101 can be approximately five micrometers (5 µm). And the waveguides 50 and 52 can be formed from Teflon AF 160 having an index or refraction of approximately 1.31.

As can be seen, a wide variety of polymers and other combinations of monomers can be satisfactorily used to form the waveguides and other switch components in accordance with teachings of the present invention. Thus, the previous discussion of some examples of chemical compounds is illustrative only and is not intended to limit the scope of the present invention in any way.

Figure 4:
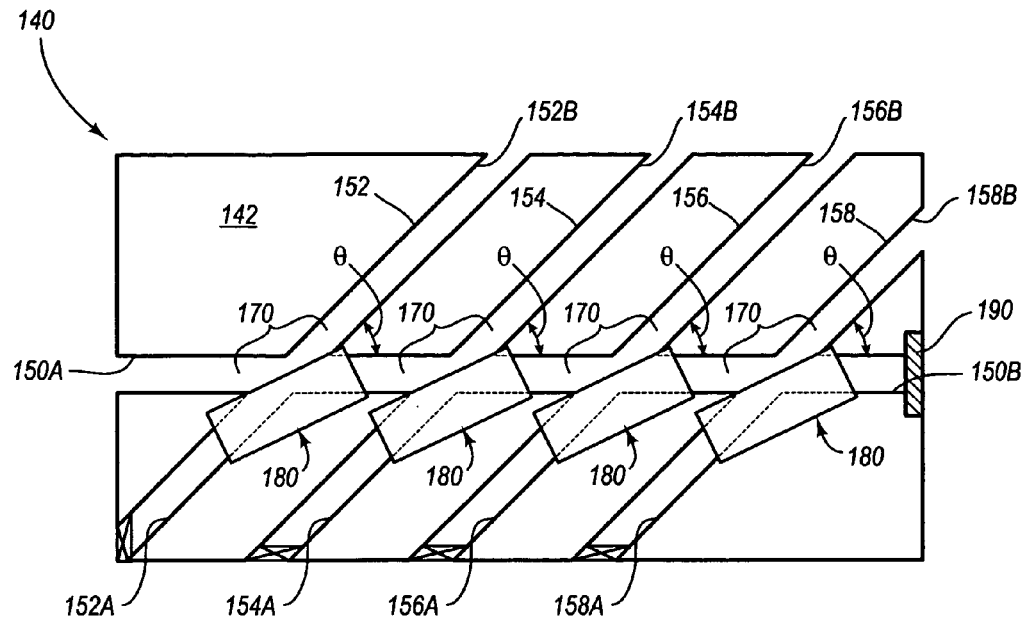
FIG. 4 is a schematic drawing of an optical switch made according to an alternative embodiment of the present invention.
Figure 5:
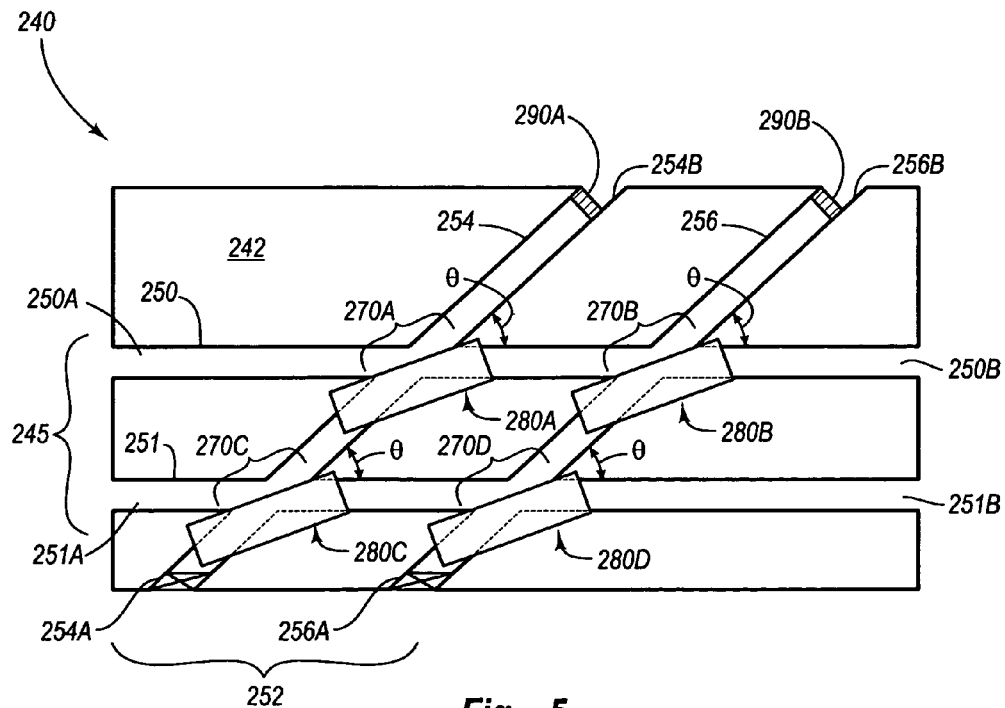
FIG. 5 is a schematic drawing of an optical switch made according to another alternative embodiment of the present invention.
Figure 6:
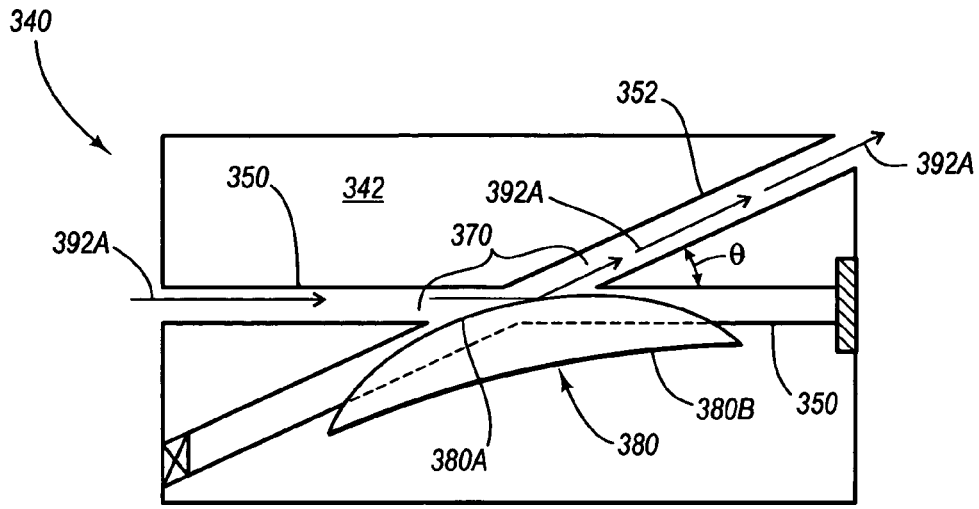
FIG. 6 is a schematic drawing of an optical switch made according to yet another embodiment of the present invention.

The following discussion relates to FIGS. 4–6, which depict certain alternative embodiments of the present invention. As the various embodiments discussed herein contain similar components, only selected aspects of the present invention will be discussed below.

Reference is now made to FIG. 4. Alternative embodiments of the present invention can include scaled configurations of the present optical switch. One example of such scaling is shown in FIG. 4, where a 1×N reflective optical switch 140 is illustrated. The switch 140 includes a substrate 142. Disposed on the substrate 142 is a primary first waveguide 150 having a first end 150A and a terminal second end 150B. The second end 150B includes a reflective component 190. A plurality of secondary waveguides 152–158 is also disposed on the substrate 142. Each secondary waveguide 152–158 includes a terminal first end 152A–158A, respectively, and a second end 152B–158B, respectively. Each secondary waveguide 152–158 intersects the first waveguide 150 at an angle θ to define a respective intersection region 170 of the waveguides. Disposed atop approximately one-half of each intersection region 170 is a diverting element, such as an electrode heater 180, which is configured to heat a specified portion of its respective intersection region, and thereby serve as a means for diverting an optical signal from one of the waveguides to another waveguide, according to the present invention.

As described, the optical switch 140 is able to redirect an incoming optical signal to any one of a plurality of outlets. In particular, the switch 140 enables an incoming optical signal to pass into the first waveguide 150 via the first end 150A. Depending on which electrode heater 180 is activated, the optical signal can be diverted to any one of the second ends 152–158B via the respective secondary waveguide 152–158. As before, the selection and activation of the electrode heater 180 can be governed by a control device (not shown). Alternatively, if none of the electrode heaters 180 is activated, the optical signal continues traveling along the first waveguide 150 past the intersection region 170 until impinging upon the reflective component 190. As was the case in the previous embodiment, impingement of the optical signal on the reflective component 190 causes the optical signal to be reflected back along the first waveguide 150 and exit the optical switch 140 at the first end 150A. Thus, the optical switch 140 of the present embodiment enables an optical signal to be deflected or reflected to any one of multiple output locations, depending on the heating of the electrode heaters 180.

Though the optical switch shown in FIG. 4 includes four secondary waveguides intersecting the first waveguide, the number of secondary waveguide can be varied as desired for a particular application. Thus, a 1×N reflective optical switch having N secondary waveguides can be configured for use in optical systems or other applications. Also, though the terminal first ends 152A–158A of the secondary waveguides are shown optically closed in FIG. 4, they could alternatively be transmissive so as to allow passage therethrough of an optical signal.

FIG. 4 also shows equal angles θ defined between the first waveguide 150 and each secondary waveguide 152–158 to be equal. In alternative embodiments, however, the intersection of each secondary waveguide with the first waveguide can be such that the magnitude of each angle θ is distinct from one or more of the other angles θ.

Reference is now made to FIG. 5, which illustrates an N×N reflective optical switch 240 made in accordance with another alternative embodiment of the present invention. The optical switch 240 includes a substrate 242. Disposed on the substrate 242 is a primary waveguide array 245 comprising first and second primary waveguides 250 and 251. Also disposed on the substrate 242 is a secondary waveguide array 252 comprising first and second secondary waveguides 254 and 256. The first and second primary waveguides 250 and 251 are preferably disposed parallel to one another, though other configurations are also possible. Likewise, the first and second secondary waveguides 254 and 256 are also preferably disposed parallel to one another. Each secondary waveguide 254 and 256 intersects each primary waveguide 250 and 251 to form one of a plurality of intersection regions 270A–270D as seen in FIG. 5. Diverting elements, such as electrode heaters 280A–280D, are disposed atop each intersection region 270, as in previous embodiments, to serve as means for diverting an optical signal from one of the waveguides to another waveguide, according to the present invention.

FIG. 5 shows reflective components 290A and 290B disposed at second ends 254B and 256B of the secondary waveguides 254 and 256, in contrast to the designs of some previous embodiments. Thus it is seen that placement of the reflective components 290 is not limited to any particular waveguide within the optical switch.

The reflective optical switch configuration shown in FIG. 5 creates an N×N switching matrix, enabling the switching of an optical signal to one of a plurality of destinations within the switch 240.

Utilization of the optical switch 240 of the present embodiment enables an optical signal to be directed in any one of a number of possible ways within the switch. In the illustrated embodiment, an optical signal can be input into the optical switch 240 via a first end 250A or a first end 251A of the first and second primary waveguides 250 and 251, respectively. The optical signal can be redirected via one or more of the electrode heaters 280A–280D into one of a plurality of waveguide paths within the optical switch. For instance, an optical signal can be input via first end 251A of the second primary waveguide 251. It may be desired to transmit the optical signal along the second waveguide 251 to exit the second end 251B. If so, no heating of either of the electrode heaters 280C or 280D takes place. Thus, the signal is transmitted along the second primary waveguide 251 until it exits at the second end 251B thereof.

In another example of possible optical signal paths, it may be desirable to utilize the reflective properties of the optical switch 240. For example, an optical signal can be input to the first primary waveguide 250 via the first end 250A thereof. Heating provided by the electrode heater 280A causes the optical signal to be redirected at the intersection region 270A from the first primary waveguide 250 to the first secondary waveguide 254. The optical signal continues along the first secondary waveguide 254 until impinging on the reflective component 290A, where it is reflected back in the opposite direction. The optical signal then enters the intersection region 270A and is again redirected to the first waveguide 250 by action of the electrode heater 280A. The optical signal can then exit the optical switch 240 via the first end 250A of the first primary waveguide 250. Note that a similar process can be employed to direct the optical signal that is input via the first end 250A to the second secondary waveguide 256 for interaction with the reflective component 290B, or to allow the signal to pass via the first primary waveguide 250 to the second end 250B thereof and exit the optical switch 240. These and other possible optical signal paths are contemplated by the present optical switch.

As evident in FIG. 5, the reflective components 290A and 290B are disposed at the second ends 254B and 256B of the secondary waveguides 254 and 256. This is in contrast to previous embodiments, where the reflective components were disposed on the horizontally disposed first waveguides. Thus, the present embodiment illustrates that placement of the reflective component on a specific waveguide can be varied as needed for a particular application or configuration.

As is seen from the above discussion, the present invention illustrated in FIG. 5 depicts only one embodiment of an N×N reflective optical switch. Indeed, the number of inputs and outputs of an optical switch configured with respect to the present embodiment can be varied as desired or needed for a particular application. For example, five or more signal inputs, and a like number of signal outputs, can be configured in one example of a reflective optical switch. Further, the number of signal inputs M can be different than the number of signal outputs N, making an M×N optical switch possible. Finally, the particular configuration of the intersection regions and electrode heaters shown in the accompanying figures can be altered to provide other routing schemes for redirection of an optical signal within reflective switches made in accordance with the present invention. Generally, the configurations depicted in the accompanying drawings are simply examples of the broader principles taught by the present invention. Modifications to the above embodiments that reside within the spirit of the present invention are therefore also contemplated as comprising part of the present invention.

Reference is now made to FIG. 6, which depicts a portion of an optical switch 340 according to an alternative embodiment of the present invention. A substrate 342 has disposed thereon intersecting first and second waveguides 350 and 352 that together define an intersection region 370. Disposed proximate the intersection region 370 is a diverting element that serves as means for diverting an optical signal from one waveguide to the other. In the present embodiment, this means is provided by structure comprising an electrode heater 380. In contrast to previous embodiments, the electrode heater 380 here comprises a rounded shape, having a convexly shaped leading surface 380A and a concavely shaped trailing surface 380B. The electrode heater 380 operates in similar fashion to the heaters of previous embodiments in diverting an optical signal from one of the waveguides 350 or 352 to the other waveguide as determined by the heating of the electrode heater. This embodiment illustrates a principle of the present invention that the particular configuration and shape of the electrode heater comprising the thermal element of the reflective optical switch can be varied according to the needs of the application.

In accordance with the embodiment described above in connection with FIG. 6, it is appreciated that the particular shape and physical configuration of the diverting element, such as the electrode heater 380, can be determined according to one or more of several parameters. These parameters include the optical field pattern, the particular structure of the waveguides and the intersection region, and the thermal diffusion coefficient and thermal capacity of the diverting element. In some cases it may be necessary to employ computer simulation to determine the optimum shape of the diverting element in a particular optical switch. Note that this discussion applies to each of the embodiments of the present invention discussed herein.

Figure 7:
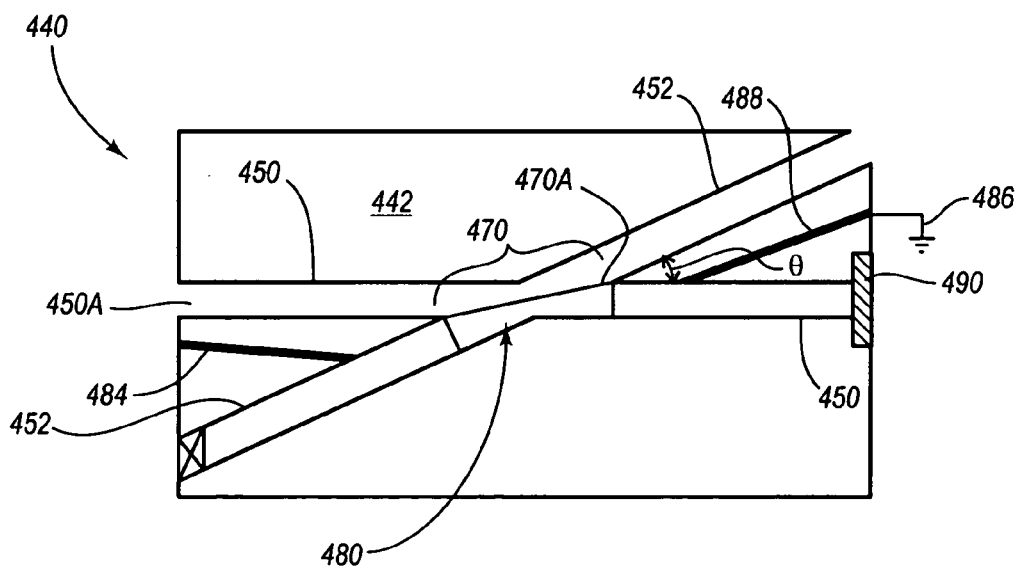
FIG. 7 is a schematic drawing of an optical switch made according to yet another embodiment of the present invention.

Reference is now made to FIG. 7, which depicts various details of an optical switch 440 according to yet another embodiment of the present invention. A substrate 442 has located thereon intersecting first and second waveguides 450 and 452 that together define an intersection region 470. Disposed proximate the intersection region 470 is a means for diverting an optical signal from one waveguide to the other. In the present embodiment, this diverting function is provided by structure comprising a diverting element 480. In contrast to previous embodiments, the diverting element 480 is not an electrode heater. Instead, in one implementation, the diverting element 480 is a liquid crystal structure topped by an electrode and positioned in the intersection region 470 along a longitudinal centerline 470, as shown in FIG. 7. In detail, the liquid crystal structure is incorporated into the waveguides 450 and 452 at the intersection region 470 along the longitudinal center line 470A, while the electrode is positioned atop the liquid crystal structure. As such, the diverting element 480 is considered as being located at the intersection region 470. The electrode of the diverting element 480 is electrically connected to an appropriate power source via leads 484 and 488.

The liquid crystal structure 480 operates, as did the electrode heaters of previous embodiments, to divert an optical signal from one of the waveguides 350 or 352 to the other waveguide. During operation of the optical switch 440, the liquid crystal structure of the diverting element 480 can be maintained in an un-powered state where no voltage is applied to the electrode via the leads 484 and 488. This allows optical signals to pass through the waveguides 450 and 452 un-deflected by the diverting element located at the intersection region 470. A voltage can then be applied to the liquid crystal structure of the diverting element 480 via the electrode and leads 484 and 488. Application of the voltage to the liquid crystal structure alters the refractive index of the liquid crystal structure, in the intersection region 470, causing it to deflect optical signals. For instance, an optical signal traveling in the first waveguide 450 from a first end 450A can be diverted to the second waveguide 452 by the liquid crystal structure of the diverting element 480 in its activated state. Thus, optical switching similar to previous embodiments is achieved. Various types of suitable liquid crystal materials can be employed in this embodiment, as appreciated by one who is skilled in the art.

In yet another embodiment, the diverting element 480 can be a semiconductor superlattice structure that, as with the liquid crystal embodiment above, serves as another example of a means for diverting an optical signal from one waveguide to another in the optical switch 440. The superlattice structure of the diverting element 480 is grown on the semiconductor substrate 442 of the optical switch 440 as to be positioned in the waveguides 450 and 452 at the intersection region 470 along the longitudinal center line 470A. As such, the diverting element 480 is considered here as being located at the intersection region 470. As with the liquid crystal implementation, a voltage can be applied to the superlattice structure using leads 484 and 488. Thus, in an unpowered state, optical signals proceed along the waveguide 450 without deflection. Correspondingly, a voltage applied to the superlattice structure alters the refractive index of the superlattice structure, a predetermined amount, thereby causing the deflection of optical signals, from the first waveguide 450 to the second waveguide 452 as has already been discussed. This deflection by the superlattice material is caused in one embodiment by the quantum stark effect. The use of superlattice and liquid crystal structures in the diverting element of the present embodiment enables high speed switching operations to occur within the optical switch, given the rapidity with which optical signals can be redirected with these means, thereby facilitating the use of such switches in high speed applications such as network packet switching, etc. It is appreciated that a variety of liquid crystal and superlattice technologies and materials can be utilized in accordance with the present embodiment, as appreciated by one skilled in the art. It is also appreciated that the particular shape and configuration of the diverting element with respect to the waveguides of the optical switch can vary from that shown in FIG. 7.

In any of the embodiments discussed above, it is possible to configure the optical switch such that the amount of optical signal reflection performed by the diverting element is specified to be within a range from no reflection (i.e., complete transmission) to complete reflection. Thus, in some implementations, the diverting element is configured to divert a specified portion of an optical signal from one waveguide to another waveguide, while enabling the remaining portion to proceed along the original waveguide. For instance, in FIG. 7, the diverting element 480 can be configured such that, when activated, its refractive index is modified such that approximately half of an optical signal incident on the diverting element in waveguide 450 is deflected into waveguide 452 while the approximate other half of the optical signal is transmitted past the diverting element to continue along waveguide 450. In such cases of partial reflection, one of the optical signal portions can be used to monitor certain parameters of the optical signal. For instance, an optical detector can be located at the end of one of the waveguides 450 or 452 to monitor the strength or other parameter of the optical signal. In one embodiment, an optical detector can replace the reflective component 490 in order to detect an optical signal portion partly transmitted past the diverting element 480. Thus, the diverting element of embodiments of the present invention discussed herein can increase the utility of the optical switch by enabling not only switching functions, but monitoring functions as well.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method of redirecting optical signals within an optical switch, the optical switch including first and second waveguides disposed on a substrate, the first and second waveguides intersecting at an angle to form an intersection region, the method comprising:
   introducing a first optical signal into a first end of the first waveguide;
   maintaining a diverting element located at the intersection region in an inactive state such that the first optical signal passes through the intersection region and remains in the first waveguide; and
   reflecting the first optical signal at a second end of the first waveguide such that the first optical signal is redirected along the first waveguide and exits the optical switch via the first end of the first waveguide.

2. A method of redirecting optical signals as defined in claim 1, further comprising:
   introducing a second optical signal into the first end of the first waveguide; and
   activating the diverting element such that a predetermined portion of the second optical signal is redirected from the first waveguide to the second waveguide at the intersection region.

3. A method of redirecting optical signals as defined in claim 2, further comprising:
   passing the predetermined portion of the second optical signal through an end of the second waveguide such that it exits the optical switch.

4. A method of redirecting optical signals as defined in claim 2, wherein activating the diverting element further comprises:
   activating the diverting element such that the index of refraction at the intersection region is altered.

5. A communications system including a plurality of optical switches, each optical switch comprising:
   a substrate;
   a first waveguide disposed on the substrate, the first waveguide capable of carrying an optical signal;
   a second waveguide disposed on the substrate, the second waveguide capable of carrying the optical signal, the second waveguide intersecting the first waveguide at an angle to define an intersection region;
   a diverting element, wherein the diverting element in an activated state can alter the index of refraction of the portion of the intersection region such that a predetermined portion of the optical signal in one of said waveguides is diverted at the intersection region from one of said waveguides to the other waveguide; and
   a reflective element disposed at a terminal end of the first waveguide, wherein the reflective element reflects optical signals incident on the reflective element back along the first waveguide.

6. A communications system as defined in claim 5, wherein the diverting element diverts the predetermined portion of the optical signal from the first waveguide to the second waveguide, and wherein the diverting element passes a remainder portion of the optical signal along the first waveguide.

7. A communications system as defined in claim 5, wherein the entirety of the optical signal is diverted at the intersection region from one of said waveguides to the other waveguide.

8. A communications system as defined in claim 5, wherein the diverting element comprises an electrode heater.

9. A communications system as defined in claim 5, wherein a cladding material is interposed between the intersection region of the waveguides and the diverting element.

10. A communications system as defined in claim 5, wherein the diverting element includes a liquid crystal structure located at the intersection region, the liquid crystal structure having a refractive index that can be modified by applying a voltage to a conductive electrode attached to the liquid crystal structure.

11. A communications system as defined in claim 5, wherein the diverting element includes a semiconductor superlattice structure located at the intersection region, the superlattice structure having a refractive index that can be modified by applying a voltage to the superlattice structure.

12. A communications system as defined in claim 5, wherein the amount of diversion of the optical signal from one of said waveguides to the other waveguide is at least partially determined by the extent of modification of the refractive index by the diverting element.

13. An optical switch for use in transmitting an optical signal, the optical switch comprising:
   a first waveguide disposed on a substrate, the first waveguide including an inlet end for receiving the optical signal;
   a plurality of secondary waveguides, each secondary waveguide disposed on the substrate and intersecting the first waveguide at an angle to define a plurality of intersection regions;
   a diverting element corresponding to each intersection region, each diverting element capable of diverting a predetermined portion of the optical signal from the first waveguide to the respective secondary waveguide; and a reflective component disposed at a terminal end of at least one of the wave guides, the reflective component operable to reflect optical signals incident upon it.

14. An optical switch as defined in claim 13, wherein the optical signal that is incident upon the reflective component is reflected toward the inlet end of the first waveguide.

15. An optical switch as defined in claim 13, wherein four secondary waveguides are disposed on the substrate.

16. An optical switch as defined in claim 13, wherein the diverting element is selected from the group consisting of an electrode heater, a liquid crystal structure, and a semiconductor superlattice structure.

17. An optical switch, comprising:
a semiconductor substrate;
a first waveguide located on the substrate, the first waveguide suitable for carrying an optical signal;
a second waveguide located on the substrate, the second waveguide suitable for carrying an optical signal, the second waveguide intersecting the first waveguide at an angle so as to define an intersection region;
a cladding material disposed atop the first and second waveguides;
an electrode heater disposed atop the cladding material, the electrode heater being located proximate the intersection region, wherein heating of the electrode heater enables an optical signal to be diverted in the intersection region from one of said waveguides to the other waveguide; and
a high reflective coating disposed at a terminal end of the first waveguide, the high reflective coating operable to reflect in the opposite direction an optical signal passing through the first waveguide that is incident on the high reflective coating.

18. An optical switch as defined in claim 17, wherein the first waveguide, the second waveguide, and the intersection region are configured so as to enable an optical signal to travel either direction along each waveguide.

19. An optical switch as defined in claim 18, wherein the optical signal is introduced into the optical switch via a first end of the first waveguide.

20. An optical switch as defined in claim 19, wherein the second waveguide further comprises an optical signal outlet, wherein optical signals that are redirected at the intersection region exit the optical switch at the optical signal outlet.

21. An optical switch as defined in claim 20, wherein the optical signal that is reflected by the reflective component exists the optical switch at the first end of the first waveguide.

22. An optical switch as defined in claim 21, wherein the electrode heater is located to provide heating to approximately one-half of the intersection region.

23. An optical switch as defined in claim 22, wherein the coating comprises sodium.

* * * * *